Figure 1:
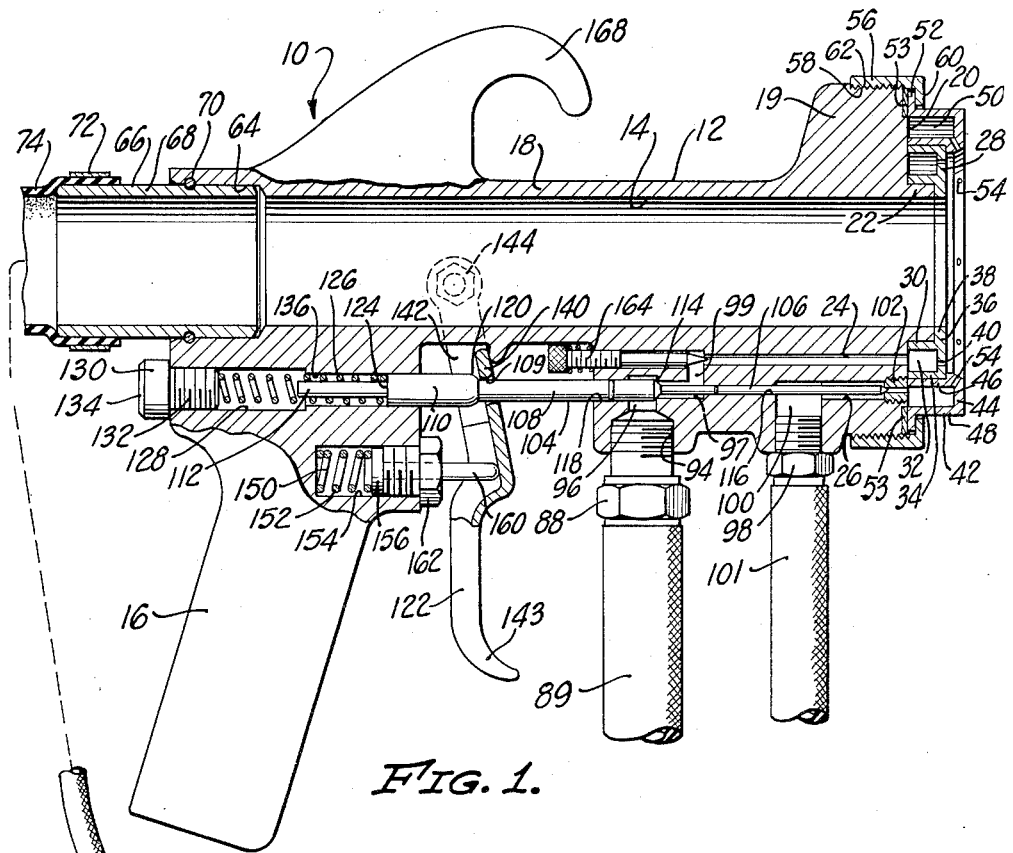

June 12, 1962 P. O. NIELSEN 3,038,750

SPRAY GUN

Filed Nov. 28, 1960

INVENTOR
PAUL O. NIELSEN
BY HIS ATTORNEYS
HARRIS, KIECH, RUSSELL & KERN

3,038,750
SPRAY GUN

Paul O. Nielsen, Santa Monica, Calif., assignor to Polymer Engineering Corporation, Pacific Palisades, Calif., a corporation of California
Filed Nov. 28, 1960, Ser. No. 72,135
7 Claims. (Cl. 239—407)

This invention relates to spray guns and, more particularly, provides a novel gun of an improved structure, capable of delivering a gas supported stream of solid particles, e.g., small pieces of insulation, through a liquid mist, for example of an adhesive-like material, the mist being generated by the gun, to a wall or other surface.

The improved gun of the present invention is particularly adaptable to use in the application of insulation particles to a wall surface or the like. While the gun is especially designed for this use, it may be employed in other settings where it is desirable to deliver a gas supported stream of solid particles through a liquid mist formed externally of the gun, but generated by streams emitting from the gun itself.

Insulation of a vertical wall is frequently achieved by tacking pre-formed insulation boards or slabs to the wall's vertical surface. This manner of insulating a vertical surface results in considerable waste unavoidably occurring in field cutting of the insulation board. The finished structure does not present a continuous insulating wall, because gaps exist at corners and even between abutting sheets of the insulation board. The cost of labor in installing insulation board is no small item. These and other disadvantages have made attractive the development of a procedure, requiring a minimum of labor, for applying insulation material to form a continuous wall without break in the insulation. An efficient procedure permitting the spraying of insulation particles to adhere against a wall surface would be welcomed.

The improved gun of the present invention delivers insulation particles via its bore through a latex-air mist external of the gun to a wall surface. The latex coated particles adhere to the wall. Various insulating materials, provided in particle size, may be used: for example, cork, kapok, asbestos, mineral wool, and various ones of the foamed elastomers such as foamed polyurethane or polystyrene. Particle sizes are preferably less than ¼", although particles of somewhat larger size may be employed. Expanded polystyrene foam plastic is available in bead form of less than 1/16" in diameter. This latter material is particularly desirable for use in the gun of the invention. The insulation particles may be coated with a powdered material, such as cement or other hydraulic-setting materials. The latex supplied to the gun is preferably a butadiene-styrene latex emulsion which upon the loss of excess moisture enters into a green cure, providing an adhesive capable of holding the insulation particles to the wall surface. The improved gun of the invention generates a latex-air mist externally of the gun proper through which the insulation particles pass and in so passing are coated with the latex emulsion. The cement or similar powdered material coating the insulation particle is believed to take up excess moisture from the aqueous butadiene-styrene latex to effect a green cure of the latex emulsion, with the result there is present on the surface of the insulation particle an adhesive capable of bonding the particle to a surface against which it is directed.

Broadly speaking, the improved spray gun of the invention comprises a gun body provided with a relatively large bore for passage of a gaseous stream carrying particles of insulation material. Means are disposed within the gun body, adjacent the outlet of the bore, for generating a mist externally of the gun and in alignment with the bore, the means including separate, forwardly-opening, liquid and gas passages within the body of the gun having closely disposed outlets of relatively small cross section. The outlets are oriented with respect to each other to promote the mixing of liquid and gas issuing therefrom to generate the mist. It is important that the mixing of the component materials entering into the insulation occur outside of the gun, in order to avoid jamming of the passages within the gun. The delivery of the solid insulation particles in a gaseous stream through a liquid mist provided externally of the gun has proven to be a satisfactory approach to the spraying of insulation particles on a wall surface. The provision of the latex mist facilitates uniform coating of the polystyrene foam beads or other insulation particles.

In a preferred embodiment of the device of the invention, the gun body includes a barrel having a relatively large bore with the barrel at its forward end being provided with a forwardly-projecting circular lip having an outside wall with a diameter significantly less than the outside dimension of the gun barrel. The gun barrel is provided with two spaced fluid passages opening in a forwardly direction through its forward end away from the circular lip. A first ring member having spaced inner and outer circular walls is positioned around the forwardly projecting lip of the gun barrel, against the forward end of the barrel, with the inner circular wall snugly engaging the outer wall of the lip. The first ring member has an annular chamber defined by the inner and outer circular walls and a forward wall joining the outer edges of the two spaced circular walls. The forward wall of the ring has several spaced, forwardly-opening apertures of small cross section. The ring member has an opening in communication with one of the forwardly-opening passages of the gun barrel through which fluid, usually the latex emulsion, is supplied to the annular chamber of the first ring member. The spray gun of this preferred embodiment is also provided with a second ring member positioned around the first ring member, likewise against the forward end of the barrel, with an inner circular wall of the second ring member snugly engaging the outer wall of the first ring member. The second ring member, like the first ring member, is provided with an annular chamber enclosed by the inner circular wall of that ring member in conjunction with an outer circular wall and a forward wall joining the two aforementioned circular walls of the second ring member at their outer edges. The outer circular wall of the second ring member carries an outwardly-extending flange. The forward wall of the second ring member has several spaced apertures of small cross section which open in a general forward direction. The second ring member is provided at its rear side with an opening, generally annular, which is in communication with the second one of the forwardly-opening passages of the barrel. The spray gun structure includes a retaining means, preferably a knurled ring member, for engaging the outwardly-extending flange of the second ring member to hold that ring member to the barrel of the gun.

Preferably the latex emulsion is supplied to the annular chamber of the inner, first ring member and air is supplied through the other one of the passages of the gun barrel to the annular chamber of the outer, second ring member. Each of the several, forwardly-opening apertures of one of the ring members is oriented with respect to a corresponding single aperture of the other ring member, so that the respective fluid streams issuing therefrom collide to generate a mist externally of the gun and also may provide if so desired a rotating motion of this mist. Means are provided for adjusting the orientation of the apertures of one of the ring members with respect to the apertures of the other ring member. In the preferred embodiment there is a single control means for simultaneously regulating flow of fluid to both of the two annular passages of the gun barrel.

The foregoing objects, advantages, features, and results of the present invention, together with various other objects, advantages, features, and results thereof which will become apparent to those skilled in the art in the light of this disclosure, may be attained with the exemplary embodiment of the invention described in detail hereinafter and illustrated in the accompanying drawing in which:

FIG. 1 is a side view, partially cut away and in part in cross section, showing a preferred embodiment of the spray gun of the invention; and The spray gun 10 of FIG. 1 is provided with a gun barrel 12, having a relatively large bore 14, affixed to a gun handle 16. The gun barrel 12 has a thick wall construction. The barrel 12 at its outer end is flared outwardly to provide a bulbous portion 19 having a forwardly facing end 20 of a significantly larger outside diameter than the outside diameter of the barrel proper. The forward end 20 carries a forwardly-projecting circular lip 22 which has an outside wall with a diameter significantly less than the outside dimension of the gun barrel. The inner wall of the circular lip coincides with the wall of the bore 14 of the gun. Two spaced fluid passages 24 and 26 open in a forwardly direction through the forward end 20 of the gun barrel 12 outside of the circular lip 22. The inner passage 24 is normally used for the flow of latex emulsion while the other outer passage 26 generally carries air.

A first fluid dispersing ring member 28 (a latex dispersing ring) is positioned around the forwardly-projecting circular lip 22 at the flared end 20 of the gun barrel 12 with an inner circular wall 30 of the ring member snugly engaging the outer wall of the lip. The ring member 28 houses an annular chamber 32 which is defined by the inner circular wall 30, together with an outer circular wall 34 spaced therefrom, and a forward wall 36 joining the outer edges of the two circular walls. The fluid ring member 28 has no back wall; however, with the ring member in its assembled position, a portion of the forward end 20 of the gun barrel 12 provides in effect a rear wall for the ring. As best seen in FIG. 1, the fluid carrying passage 24 opens into the annular chamber 32 of the fluid ring member 28. The forward wall 36 of the fluid ring member 28 extends inwardly beyond its juncture with the inner circular wall 30 to provide a ledge 38 which rests against the forward end of the circular lip 22, stopping at the bore 14 of the gun barrel. The fluid ring member 28 has several spaced, forwardly-opening apertures 40, eight in the embodiment illustrated. These apertures 40 permit the escape of fluid from the annular chamber 32 in a direction parallel to the axis of the gun barrel 12.

Figure 2:
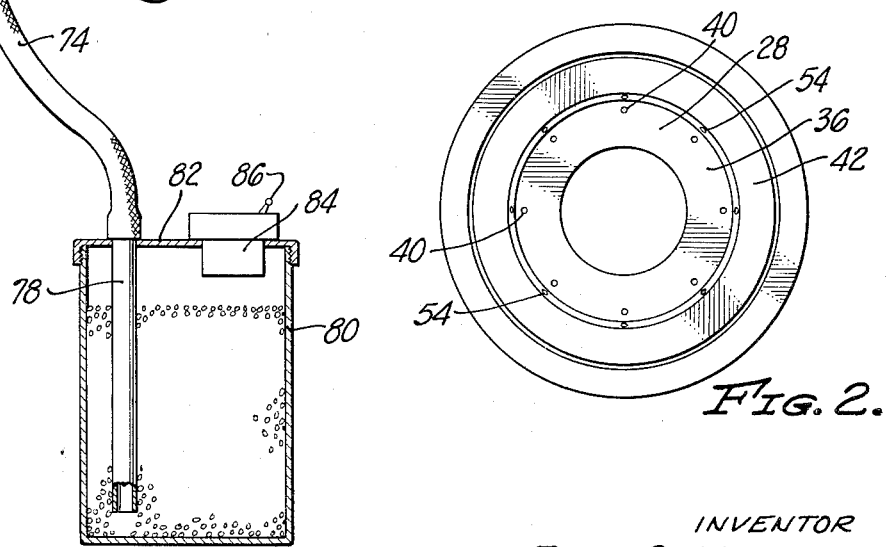

A second fluid dispersing ring member 42 which may be described as an air ring, is fitted around the fluid ring member 28 in the assembled gun as shown in FIG. 1. The air ring, like the fluid ring member 28, has no rear wall, and is provided with a forward wall 44 which joins two spaced circular walls 46 and 48. The inner circular wall 46 snugly engages the outer wall 34 of the first fluid ring member 28. This inner wall 46, the outer circular wall 48, and the transversely-extending forward wall 44 together define a second annular chamber 50. It will be noted that the outer circular wall 48 has an integral outwardly-extending flange portion 52. The forward wall 44 of the air ring 42 is provided with several spaced apertures 54 opening in a generally forward direction, leading from the second annular chamber 50. The apertures 54 in the particular embodiment illustrated open at an angle of approximately 45° to the diameter of the air ring 42 in an inwardly direction. The two fluid ring members 28 and 42 are provided with the same number of apertures. Each of the several forwardly-opening apertures of the air ring 42 is aligned, as best seen in FIG. 2, with a corresponding aperture of the latex ring 28. This is done to assure that the respective fluid streams of air and latex issuing from the two rings will collide to generate a mist.

A plane extending longitudinally of the gun and containing the axis of the gun barrel 12 and cutting through an aperture of one of the two fluid ring members 28 and 42 will pass through a corresponding aperture of the other ring member. Latex emitting from the inner fluid ring member 28 leaves that ring in a line lying substantially parallel to the axis of the gun barrel 12. Air issuing from the outer fluid ring member 42 exits in a stream with an angle of approximating 45° to the stream emitting from the latex ring member 28. Also by indexing one hole to the left or right of the adjacent hole of the other ring, produces a component angle resulting in a revolution of the resulting spray. This is desirable in some cases when greater wetting of each bead is desirable. The spinning action rotates the bead exposing it to more mist.

A knurled ring member 56 having an internally threaded wall 58 with an inwardly-extending flange 60 at its forward end, engages an exteriorly-threaded portion 62 of the bulbous portion 19 of the gun barrel 12. The inwardly-extending flange 60 of the knurled ring member 56 at its inner side engages the outer wall of the outwardly-extending flange 52 of the second ring member 42, holding the flange 52 in tight engagement with a sealing washer 53. The threading of the knurled ring member 56 to engage substantially all of the exterior threads of the bulbous portion 19 results in locking the outer ring member 42 and the inner ring member 28 against the sealing washer 53 at the forward end 20 of the gun barrel 12. Shifting of one of the fluid ring members 28 or 42 with respect to the other, before cinching down of the knurled ring 56, to align the corresponding apertures of the two fluid ring members, places the gun in its operative form.

The bore 14 at its rearward end 64 is slightly enlarged to provide a chamber for receiving a tube connector assembly 66, which is made up of a short tube member 68, a split snap ring 70, and a metal band 72 which secures a material feed hose 74 to the outer end of the tube member 68. The split snap ring 70 seats in an external groove provided in the external wall of the inner end of the tube member 68, with the outer wall of the snap ring engaging a mating groove provided in the wall of the bore 14. One end of the material feed hose 74 is fastened to a siphon tube 78 placed within a container 80 with its lower end spaced a short distance from the bottom of that container. The container 80 carries on its top closure 82 a motor and air fan 84 which, when operating, provide a small gauge pressure of three to five p.s.i.g. within the container 80. The container 80 is filled with insulation particles, for example, polystyrene foam beads, to the level indicated in FIG. 1. The small positive pressure on the surface of the insulation particle bed is adequate to provide a gas supported stream of the solid particles through the material feed hose 74 to the bore 14 of the gun when the air motor is operating. The air motor is controlled through a switch 86.

Liquid latex is supplied to the body passage 24 of the gun 10 through a quick-connect type fitting 88 to which a latex supply hose 89 is connected. The upper end of the fitting 88 is externally threaded to engage the internal threads of a downwardly-opening cavity 94 provided at the underside of the gun barrel 12. The cavity 94 is connected through a series of short passageways 96, 97, and 99 to the aforementioned latex passage 24 leading to the inner, first fluid ring member 28. Forward of the fitting 88, there is provided a smaller quick-connect type fitting 98 to which an air hose 101 is connected. The second fitting 98, like the latex fitting 88, carries external threads at one end which engage internal threads of a second, downwardly facing cavity 100 in the gun barrel 12. The air passage 26 of the gun barrel 12 opens laterally into the top of the second body cavity 100. The forward end of the air passage 26 is internally threaded to receive a valve seat insert 102.

Flow of latex emulsion and air through the respective passages 24 and 26 is simultaneously controlled through operation of an elongated, flow control needle 104. The control needle 104 is made up of four succeeding segments including a first valve portion 106, a second valve portion 108, a trigger engaging portion 110 and a coil spring retainer stem 112, arranged in that order from the outer, forward end of the control needle to its rear end. The first valve portion 106 at the forward end of the control needle 104, is the longest of the four segments making up the control needle and, like the others, has a circular cross section. The first valve portion 106 has the smallest diameter of all four segments and terminates in a tapering valve point which, when the control needle is in its closed position, seats in the valve seat insert 102, closing the passage 26 to the flow of air. When the flow control needle 104 is moved rearwardly, the first valve portion 106 leaves the valve seat insert 102, opening the passage 26 to the flow of air. The second valve portion 108 has a diameter somewhat larger than that of the first valve portion 106 and with the flow control needle 104 in its closed position, the second valve portion 108 blocks the short passageway 97, preventing the flow of latex via the fitting 88 to the latex passage 24 of the gun barrel 12. The forward end of the second valve portion 108 has a shoulder 114 which, in the closed position, seats against the entrance port of the passageway 97. As seen in FIG. 1, the flow control needle 104 parallels the axis of the gun bore 14 and the first and second valve portions 106 and 108 are respectively movably carried in guideways 116 and 118 formed in the underside of the gun barrel 12. As illustrated, the two guideways 116 and 118 are in alignment. The major portion of the second valve portion 108 of the flow control needle 104 extends rearwardly from the guideway 118, and is outside of the body of the gun proper. The second valve portion 108 at its rearward end expands into the trigger engaging portion 110 of the flow control needle 104. A shoulder 120 formed at the juncture of the second valve portion 108 and the trigger engaging portion 110 is adapted to engage a trigger assembly 122 with the smaller diameter second valve portion 108 extending forwardly through an aperture 109 of the trigger. The aforementioned coil spring retainer stem 112 of the flow control needle 104 extends rearwardly from the trigger engaging portion 110. The stem 112 has a diameter significantly less than the adjoining trigger engaging portion 110, thus providing a shoulder 124 at the juncture of the two segments against which a coil spring 126 rests, which tends to force the flow control needle 104 forwardly, to the right in FIG. 1, to close off the two fluid passageways 24 and 26.

The upper portion of the handle 16 is provided with a spring retaining cavity 128 which is internally threaded to receive a compression adjusting screw 130, which has a threaded body 132 terminating in a head 134. The forward end of the spring retaining cavity 128 opens into a flow control needle guide passageway 136 of somewhat reduced diameter. The coil spring 126 has substantially the diameter of the guideway 136 and extends from the compression adjusting screw 130 inwardly through the spring retaining cavity 128 and a portion of the guideway 136, terminating against the aforementioned shoulder 124 of the trigger engaging portion 110. The compression provided by the coil spring 126 may be varied by turning the compression adjusting screw 130 to different positions.

The trigger assembly 122 is made up of a yoke 140 formed of two arms 142 and a trigger spring sub-assembly 150, with a trigger proper 143 being a continuation of the underside of the yoke. The arms 142 of the yoke 140 are pivotally connected to opposite sides of the gun barrel 12 by screws 144 which are threaded into the wall 18 of the barrel. Neither of the screws 144 penetrates the wall 18 of the gun barrel. By employing a yoke, it is possible to leave the bore 14 of the gun clear and unobstructed to the flow of the air supported stream of insulation particles. The yoke 140 ends immediately below the underside of the flow control needle 104. The aforementioned aperture 109 for the control needle 104 is in the base of the yoke 140. The trigger 122 has a generally U-shaped cross section.

The trigger spring subassembly 150 serves to hold the trigger 122 in its off position, in which position the flow control needle 104 closes off the fluid passages 24 and 26. The trigger spring subassembly 150 comprises a compression spring 152 positioned in a compression spring cavity 154 of the gun handle, with one end of the spring engaging the face of a plunger member 156, which member has a forwardly extending stem 160. The stem passes through a central hole of a trigger spring compression adjusting screw 162, and beyond this screw the free end of the plunger stem 160 engages the trigger 122. Turning of the trigger spring screw 162 in and out of the cavity 154 (into which it is threaded) permits adjustment of the compression strength of the spring 152. With the plunger member 156 engaging the inner wall of the screw 162, the trigger assumes its full off position, and in this position the coil spring 126 forces the flow control needle 104 into its full off position, closing the two fluid passages 24 and 26. An operator applying force to the trigger 122 compresses the trigger compression spring 152, moving the trigger towards the handle, and with further activation of the trigger, the shoulder 120 of the trigger engaging portion 110 of the flow control needle 104 contacts the trigger proper and is moved to the left as seen in FIG. 1, against the compression of the coil spring 126 and, in so doing, the first valve portion 106 moves away from the valve seat insert 102, opening the passage 26 to the flow of air, and simultaneously the second valve portion 108 is moved, opening the passageway 97 and passage 24 to the flow of the latex emulsion.

The latex passage 24 is provided with an overriding needle valve 164 at its inner end. A forwardly-opening hook 168 is provided at the top of the gun barrel 12 for ease of manipulation. The latex emulsion supplied to the fitting 88 and the compressed air supplied to the second fitting 98 are generally each under a pressure in the range of 35 to 40 p.s.i.g.

As mentioned earlier, it is important to avoid jamming of the passageways with the latex emulsion. The gun of the invention is specially designed to facilitate cleaning of the device on termination of its use. It will be apparent that the two fluid ring members 28 and 42 may be readily removed from the gun through removal of the knurled ring member 56. The elongated flow control needle 104 is easily removed by unscrewing and removing the compression adjusting screw 130 of the gun handle 12. After removal of the compression adjusting screw 130, the flow control needle and coil spring are removed from the gun by simply tilting the device. The fittings 88 and 98 are of the quick connect type and are also readily removed. Thus it is seen that the gun may be stripped and its components quickly placed in a suitable solvent. In some operations it may be feasible upon discontinuing the flow of the latex emulsion to substitute a solvent line to the fitting 88 and in this fashion subject the gun to an initial clean-up. Of course, while so cleaning the gun, the material feed hose is disconnected.

Certain portions of the gun, specifically the two fluid rings 28 and 42 can be made of easily removable and expendable moulded parts (i.e. polyethylene injection moulded plastic) that can be discarded and replaced rather than cleaned after each use.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:

1. A gun for delivering a gas supported stream of solid particles through a liquid mist, comprising: a gun body including a barrel having a relatively large bore for the passage of a particle-carrying gaseous stream, said barrel at its forward end having a forwardly-projecting circular lip having an outside wall with a diameter significantly less than the outside dimension of the gun barrel, said barrel having two spaced fluid passages opening in a forwardly direction through the forward end of the barrel spaced outwardly from the lip; a first ring member positioned around said forwardly-projecting lip and against the forward end of the barrel with an inner circular wall of said ring member snugly engaging the outer wall of the lip, said ring member providing an annular chamber defined by said inner circular wall in conjunction with an outer circular wall spaced therefrom and a forward wall joining the outer edges of the two circular walls, said forward wall having several spaced, forwardly-opening apertures of small cross section, said ring member having an opening in communication with one of the forwardly-opening fluid passages of the barrel; a second ring member positioned around the first ring member and against the forward end of the barrel with an inner circular wall of said second ring member snugly engaging the outer wall of the first ring member, said second ring member providing an annular chamber enclosed by said said inner circular wall thereof in conjunction with an outer circular wall thereof spaced from the inner wall and a forward wall joining the outer edges of the two circular walls, said forward wall having several spaced, forwardly-opening apertures of small cross section, said second ring member having an opening in communication with the other one of the forwardly-opening fluid passages of the barrel; and a retaining means for removably holding the second ring member to the barrel of the gun.

2. A gun in accordance with claim 1 wherein the first ring member and the second ring member are made of plastic.

3. A gun for delivering a gas supported stream of solid particles through a liquid mist, comprising: a gun body including a barrel having a relatively large bore for the passage of a particle-carrying gaseous stream, said barrel at its forward end having a forwardly-projecting circular lip having an outside wall with a diameter significantly less than the outside dimension of the gun barrel, said barrel having two spaced fluid passages opening in a forwardly direction through the forward end of the barrel spaced from the lip; a first ring member positioned around said forwardly-projecting lip and against the forward end of the barrel with an inner circular wall of said ring member snugly engaging the outer wall of the lip, said ring member having an annular chamber defined by said inner circular wall in conjunction with an outer circular wall spaced therefrom and a forward wall joining the outer edges of the two circular walls, said forward wall having several spaced, forwardly-opening apertures of small cross section, said ring member having an opening in communication with one of the forwardly-opening fluid passages of the barrel; a second ring member positioned around the first ring member and against the forward end of the barrel with an inner circular wall of said second ring member snugly engaging the outer wall of the first ring member, said second ring member having an annular chamber enclosed by said inner circular wall in conjunction with an outer circular wall spaced from the inner wall and having an outwardly-extending flange member and a forward wall joining the outer edges of the two circular walls, said forward wall having several spaced, forwardly-opening apertures of small cross section, said second ring member having an opening in communication with the other one of the forwardly-opening fluid passages of the barrel; and a retaining means for engaging the outwardly-extending flange member of the second ring member to hold that ring member to the barrel of the gun.

4. A gun in accordance with claim 3 wherein control means are provided for regulating fluid flow through the two spaced fluid passages of the barrel to the annular chambers of the two ring members.

5. A gun in accordance with claim 4 wherein the control means is provided with means for simultaneously regulating the flow of fluid to the two annular chambers.

6. A gun in accordance with claim 3 wherein the several forwardly opening apertures of one of the ring members are oriented with respect to the several apertures of the other ring member, so that the respective fluid streams issuing therefrom collide to generate a mist.

7. A gun in accordance with claim 6 wherein means are provided for adjusting the orientation of the apertures of one of the ring members with respect to the apertures of the other ring member.

References Cited in the file of this patent

UNITED STATES PATENTS

| | | |
|---|---|---|
| 2,177,851 | Wallace | Oct. 31, 1939 |
| 2,433,463 | Lampe | Dec. 30, 1947 |
| 2,578,412 | Fisher | Dec. 11, 1951 |
| 2,732,258 | Fisher | Jan. 24, 1956 |
| 2,786,716 | Peeps | Mar. 26, 1957 |
| 2,889,237 | Ball | June 2, 1959 |

UNITED STATES PATENT OFFICE
CERTIFICATE OF CORRECTION

Patent No. 3,038,750                  June 12, 1962

Paul O. Nielsen

It is hereby certified that error appears in the above numbered patent requiring correction and that the said Letters Patent should read as corrected below.

Column 3, line 13, after "and" insert the following paragraph:

-- FIG. 2 is an end view of the spray gun of FIG. 1. --;

column 7, line 31, strike out "said", second occurrence.

Signed and sealed this 16th day of October 1962.

(SEAL)
Attest:

ERNEST W. SWIDER
Attesting Officer

DAVID L. LADD
Commissioner of Patents